Patented Oct. 15, 1940

2,217,697

UNITED STATES PATENT OFFICE 2,217,697

PRODUCTION OF RESIST EFFECTS ILLUMINATED WITH VAT DYESTUFF

Denys Percival Milburn, Blackley, Manchester, England, assignor to Imperial Chemical Industries Limited, a corporation of Great Britain No Drawing. Application July 28, 1939, Serial No. 287,004. In Great Britain July 29, 1938

3 Claims. (Cl. 8—65)

This invention relates to the dyeing and printing of textile materials.

This invention has as an object to devise a new process of printing textile materials whereby there are obtained resist effects illuminated with vat dyestuffs. Further objects will appear hereinafter. These objects are accomplished by the following invention.

I have found that I can obtain such resist effects if I apply to a fabric composed wholly or partly of cellulose, for instance, cotton or viscose rayon, a vat dyestuff printing paste comprising, together with other usual ingredients, an organic isocyanate of the formula R—X—N=C=O, in which R is a normal or branched chain saturated or unsaturated aliphatic hydrocarbon radical containing at least twelve carbon atoms, and X represents a substituted or unsubstituted aromatic or hydro-aromatic hydrocarbon radical or a substituted or unsubstituted aliphatic, aromatic or hydro-aromatic hydrocarbon radical which is linked to the radical R through one of the groups O, S, CO—O, O—CO, NR', NR'—CO, CO—NR', SO₂, NR'—SO₂, SO₂—NR', (R' being a hydrocarbon radical); and then steam the fabric, preferably after drying it, and dye it with any suitable dyestuff to give coloured patterns on a differently coloured ground. The ground colour is preferably applied by padding.

If desired, the said isocyanates may be used in conjunction with other known resist agents, for example, gelatine, glue size, or other proteins or albumenoids.

It is convenient to employ the isocyanates in the form of aqueous emulsions or suspensions which may be produced, if desired, with the aid of an emulsifying agent such, for example, as a sulphated fatty alcohol. Alternatively, a solution of the isocyanate in an organic liquid of comparatively low boiling point, for example benzene, may be stirred into the printing paste and stirring continued until the solvent has evaporated off and the isocyanate thus dispersed throughout the printing paste.

As dyestuffs for providing the ground colour I use vat dyestuffs (applied either as such from reduction medium or in the soluble leuco ester form), azoic colours applied, for instance, as ready-for-printing preparations of e. g. diazoamino compound and coupling component, and mordant dyestuffs.

In carrying the invention into practical effect it is preferable to work as far as possible at low temperatures, as by using cold padding liquors and drying the fabric after padding by means of hot air rather than by passing it over heated cylinders. It is believed that the success of the process depends upon the production during the steaming operation (which also serves to fix the vat dyestuff on the fibre) of temporarily water-repellent areas on the fabric where the printing paste has been applied. Such water-repellency would be impaired or destroyed by working at elevated temperatures.

Padding is preferably done through the nip to minimise the time of contact of the fabric with the padding liquor.

As thickening agent there may be used, for example, British gum, starch-British gum, gum senegal or gum arabic.

The following examples, in which parts are by weight, serve to illustrate but do not limit the invention.

Example 1

A cellulosic fabric, for instance, cotton or viscose rayon, is printed in the usual way with one of the following vat dyestuff printing pastes:—

| | A | B |
|---|---|---|
| | Parts | Parts |
| Flavanthrone, 7% aqueous paste | 10 | |
| Dimethoxydibenzanthrone, 7% aqueous paste | | 10 |
| Sodium formaldehyde sulphoxylate | 8 | 8 |
| Potassium carbonate | 13 | 13 |
| Starch-British gum thickening | 40 | 45 |
| Zinc oxide powder | 10 | |
| p-Cetylphenyl isocyanate | 4 | 4 |
| Sodium cetyl sulphate | 0.3 | 0.3 |
| Water | 14.7 | 19.7 |
| | 100 | 100 |

After printing, it is dried, steamed at 100° C. for 5–20 minutes and nip-padded with one of the following solutions of leuco esters of vat dyestuffs:—

| | A | B |
|---|---|---|
| | Parts | Parts |
| Sulphuric ester of leuco dimethoxydibenzanthrone 12% aqueous paste | 3 | |
| Sulphuric ester of leuco 6:6'-diethoxy-2:2'-bis-thionaphthenindigo | | 0.7 |
| Tragacanth thickening 6% | 5 | 5 |
| Sodium nitrite 30% aqueous solution | 3 | 3 |
| Water | 89 | 91.3 |
| | 100 | 100 |

Solution A is employed with material which has been printed with the printing paste A, and solution B with material printed with the paste B.

After padding, the material is dried, developed by passage through a 2% aqueous solution of sulphuric acid (168° Tw.), at 70° C., thoroughly washed and soaped at the boil.

Treatment A gives a bright clear-cut yellow pattern on a green ground; treatment B a bright clear-cut green pattern on an orange ground.

*Example 2*

A cotton fabric is printed with one of the following vat dyestuff printing pastes:—

|  | A | B |
|---|---|---|
| Flavanthrone, 7% aqueous paste | Parts 10 | Parts |
| 6:6'-diethoxy-2:2'-bis-thionaphthenindigo 10% paste |  | 7 |
| Sodium formaldehyde sulphoxylate | 8 | 8 |
| Potassium carbonate | 13 | 13 |
| Starch-British gum thickening | 55 | 55 |
| p-Cetylphenyl isocyanate | 4 | 4 |
| Sodium cetyl sulphate | 0.2 | 0.2 |
| Water | 9.8 | 12.8 |
|  | 100 | 100 |

The fabric is then dried, steamed at 100° C. for 5–20 minutes and padded in the following solution:

| | Parts |
|---|---|
| Dimethoxydibenzanthrone 7% aqueous paste | 1 |
| Sodium formaldehyde sulphoxylate | 5 |
| Potassium carbonate | 8 |
| Tragacanth thickening 6% | 5 |
| Water | 81 |
| | 100 |

The fabric is then dried, steamed, oxidised and soaped at the boil.

There is thus obtained a bright clear-cut yellow (A) or orange (B) pattern on a green ground.

*Example 3*

A cotton fabric is printed with one of the following vat dyestuff printing pastes:

|  | A | B |
|---|---|---|
| Flavanthrone, 7% aqueous paste | Parts 10 | Parts |
| Dimethoxydibenzanthrone, 7% aqueous paste |  | 10 |
| Sodium formaldehyde sulphoxylate | 8 | 8 |
| Potassium carbonate | 13 | 13 |
| Starch-British gum thickening | 45 | 45 |
| p-Cetylphenyl isocyanate | 4 | 4 |
| Sodium cetyl sulphate | 0.2 | 0.2 |
| Water | 19.8 | 19.8 |
|  | 100 | 100 |

The material is then dried and steamed as in Example 1, padded with one of the following:

|  | A | B |
|---|---|---|
| An ice colour preparation containing a diazoimino compound from 4-benzoylamino-2:5-diethoxyaniline stabilized, for example, with sarcosine as described in British Specification No. 320,324 and 2:3-hydroxynaphthoic anilide, in the usual commercial form as 75% powder | Parts 2 | Parts |
| An ice colour preparation containing a diazoimino compound from 4-chloro-o-toluidine stabilised, for example, with 2-amino-4-sulphobenzoic acid as described in British Specification No. 324,041 and 2:3-hydroxynaphthoic-o-toluidine in the usual commercial form as 65% powder |  | 0.7 |
| Sodium cetyl sulphate |  | 0.2 |
| Caustic soda solution 90° Tw |  | 1 |
| Tragacanth thickening 6% | 2 | 5 |
| Water | 91 | 93.1 |
|  | 100 | 100 |

Solution A is used in conjunction with paste A; solution B with paste B.

The fabric is then dried and developed by steaming for ¼–½ hour in the presence of acetic and formic acid vapour and finally soaped at the boil.

Treatment A gives a bright clear-cut yellow pattern on a blue ground; treatment B a bright clear-cut green pattern on a pink ground.

*Example 4*

A cotton fabric is first prepared with the following coupling component solution:

| | Parts |
|---|---|
| 2:3-hydroxynaphthoic anilide | 1.5 |
| Diacetone alcohol | 1.5 |
| Caustic soda solution 90° Tw | 1.5 |
| Sodium cetyl sulphate | 0.2 |
| Water | 95.3 |
| | 100 |

The fabric is then dried, printed as in Example 2B, dried, steamed at 100° C. for 5–10 minutes and then padded with the following diazo solution:

| | Parts |
|---|---|
| The tetrazo compound from dianisidine stabilised with zinc chloride (in its usual commercial form as 20% powder) | 3 |
| Tragacanth thickening 6% | 5 |
| Water | 92 |
| | 100 |

The material is then dried, washed and soaped at the boil. There is thus obtained a bright clear-cut orange pattern on a blue ground.

*Example 5*

A cellulosic fabric (cotton or viscose rayon) is printed with a vat dyestuff paste of the following composition:

| | Parts |
|---|---|
| 6:6' - dichloro -2:2'-bis-thionaphthenindigo 12% aqueous paste | 8 |
| Sodium formaldehyde sulphoxylate | 8 |
| Potassium carbonate | 13 |
| Starch-British gum thickening | 45 |
| p-Cetylphenyl isocyanate | 4 |
| Sodium cetyl sulphate | 0.3 |
| Water | 21.7 |
| | 100 |

The fabric is dried, steamed at 100° C. for 10 minutes and nip-padded with the following solution:

| | Parts |
|---|---|
| α-Nitro-β-naphthol as 85% powder | 2 |
| Ferrous sulphate aqueous solution 21° Tw | 4 |
| Tragacanth thickening 6% | 5 |
| Water | 89 |
| | 100 |

It is then air-dried, immersed for 2 minutes in a boiling 2% solution of sodium carbonate, washed and soaped at the boil. There is thus obtained a bright clear-cut pink pattern on a green ground.

*Example 6*

A cotton fabric is printed with a dyestuff paste of the following composition:

| | Parts |
|---|---|
| 5:7:5':7'-tetrabromindigo 38% aqueous paste | 4 |
| Sodium formaldehyde sulphoxylate | 8 |
| Potassium carbonate | 13 |
| Starch-British gum thickening | 45 |
| p-Cetylphenyl isocyanate | 4 |
| Sodium cetyl sulphate | 0.3 |
| Water | 25.7 |
| | 100 |

The fabric is dried, steamed at 100° C. for 10 minutes and nip-padded with the following solution:

| | Parts |
|---|---|
| 3-Nitroalizarine 15% aqueous paste | 2 |
| Acetate of chrome liquor 28° Tw | 8 |
| Tragacanth thickening 6% | 5 |
| Water | 85 |
| | 100 |

It is then air-dried, steamed at 100° C. for ½-hour, washed and soaped at the boil. There is thus obtained a bright clear-cut blue pattern on a brown ground.

*Example 7*

A cotton fabric is prepared by padding with a 1% solution of sodium nitrite, dried and printed as in Example 2B. After steaming at 100° C. for 5-10 minutes it is padded with the following ester salt solution:

| | Parts |
|---|---|
| Sulphuric ester of leuco 16:17-diethylene ether of dihydroxydibenzanthrone 20% aqueous paste | 3 |
| Tragacanth thickening 6% | 5 |
| Water | 92 |
| | 100 |

The fabric is then air-dried, developed by passage through a 2% aqueous solution of sulphuric acid (168° Tw.) at 70° C., thoroughly washed and soaped at the boil. There is thus obtained a bright clear-cut orange pattern on a blue ground.

*Example 8*

Cotton fabric is printed and steamed as in Example 2B and is then padded in a liquor of the following composition:

| | Parts |
|---|---|
| Dimethoxybenzanthrone 7% aqueous paste | 2 |
| Caustic soda aqueous solution 90° Tw | 2 |
| Sodium hydrosulphite | 2 |
| Water | 44 |
| Tragacanth thickening 6% | 5 |
| Water | 45 |
| | 100 |

In making up the liquor the first four ingredients are heated together until the dyestuff is completely dissolved. The solution is then cooled and the tragacanth thickening and additional water (previously mixed) are added. The fabric is exposed to the air for half a minute and then oxidised in the manner usual for vat dyestuffs. It is finally soaped at the boil. There is thus obtained a bright clear-cut orange pattern on a green ground.

The following are examples of suitable isocyanates for use in the invention: p-dodecylphenyl isocyanate, p-cetylphenyl isocyanate, 4-dodecyl-2-methylphenyl isocyanate, 3-nitro-4-dodecylphenyl isocyanate, 2 - nitro - 4 - dodecylphenyl isocyanate, p-cetylcyclohexyl isocyanate, p-cetyloxyphenyl isocyanate, p-dodecyloxyphenyl isocyanate, o-myristyloxyphenyl isocyanate, p - dodecylthiophenyl isocyanate, p - cetylthiophenyl isocyanate, carboheptadecyloxyethyl isocyanate, p-carbododecyloxyphenyl isocyanate, p-carbocetyloxyphenyl isocyanate, p-carboctadecyloxyphenyl isocyanate, p-stearyloxyphenyl isocyanate, cetyloxyethyl isocyanate, N-dodecyl-N-methylaminoethyl isocyanate, N-tetradecyl-N-methyl-aminoethyl isocyanate, 4-stearomethylamidophenyl isocyanate of the formula $C_{17}H_{35}-CO-N(CH_3)-C_6H_4-N=C=O$, 2 - octadecylsulphonophenyl isocyanate of the formula $C_{18}H_{37}-SO_2-C_6H_4-N=C=O$, 2 - cetylsulphonomethylamidophenyl isocyanate of the formula $C_{16}H_{33}-SO_2-N(CH_3)-C_6H_4-N=C=O$, the isocyanate of formula
$C_{17}H_{35}-N(CH_3)-CO-C_6H_4-N=C=O$,
derived from p-amino-N-methyl-N-heptadecylbenzamide, and the isocyanate of formula
$C_{17}H_{35}-N(CH_3)-SO_2-C_6H_4-N=C=O$,
derived from p-amino-N-methyl-N-heptadecylbenzenesulphonamide. Many of these isocyanates are known compounds. Others may be prepared by known general methods, for example, by treating the appropriate acid chlorides with silver cyanide (see Berichte der deutschen Chemischen Gesellschaft, 1903, Vol. 36, pages 3213-3221) or with sodium azide (see Berichte der deutschen Chemischen Gesellschaft, 1909, Vol. 42, pages 3356-3362) or by phosgenating the appropriate amines (see British Specification No. 462,182 and U. S. Serial No. 168,668).

As any apparently widely different embodiments of this invention may be made without departing from the spirit and scope thereof, it is to be understood that the invention is not limited to the specific embodiments thereof except as defined in the appended claims.

I claim:
1. Process for the production of resist effects illuminated with vat dyestuffs on fabrics composed wholly or partly of cellulose which comprises applying to the said fabric a vat dyestuff printing paste containing as resist agent an organic isocyanate of the formula R—X—N=C=O, in which R is an aliphatic hydrocarbon radical containing at least 12 carbon atoms and X is a radical selected from the group consisting of aromatic and hydroaromatic hydrocarbon radicals, and aliphatic, aromatic and hydroaromatic hydrocarbon radicals which are linked to the radical R through one of the groups O, S, CO, CO—O, O—CO, NR', NR'—CO, CO—NR', SO₂, NR'—SO₂, SO₂—NR', wherein R' represents a hydrocarbon radical, steaming the so treated fabric, and applying to it another dyestuff to produce a differently colored ground.

2. Process as claimed in claim 1 in which the dyestuff used to provide the ground shade is one selected from the group consisting of another vat dyestuff, an azoic dyestuff and a mordant dyestuff.

3. Process as claimed in claim 1 wherein the organic isocyanate employed as a resist agent is para-cetyl-phenyl isocyanate.

DENYS PERCIVAL MILBURN.